United States Patent [19]

Dillier et al.

[11] Patent Number: 4,811,598
[45] Date of Patent: Mar. 14, 1989

[54] DOWNHOLE TEMPERATURE MEASUREMENTS

[75] Inventors: Justin M. Dillier, La Habra; Richard H. Clark, Bakersfield, both of Calif.

[73] Assignee: Chevron Research Company, San Francisco, Calif.

[21] Appl. No.: 90,496

[22] Filed: Aug. 28, 1987

[51] Int. Cl.$^4$ .............................................. E21B 49/00
[52] U.S. Cl. ...................................... 73/154; 166/250
[58] Field of Search .................. 73/153, 154; 166/241, 166/64, 250; 374/136, 141, 183–185; 250/268, 254

[56] References Cited

U.S. PATENT DOCUMENTS

| | | | |
|---|---|---|---|
| 2,190,260 | 2/1940 | Ennis | 374/136 |
| 2,764,024 | 9/1956 | Rumble | 374/136 |
| 3,014,529 | 12/1961 | Graham | 166/250 X |
| 3,164,988 | 1/1965 | Cook | 73/154 |
| 3,363,457 | 1/1968 | Ruehle et al. | 73/154 |
| 3,668,927 | 6/1972 | Howell et al. | 73/154 |
| 3,874,232 | 4/1975 | Hardison | 73/154 |
| 3,981,187 | 9/1976 | Howell | 73/154 |
| 4,109,717 | 8/1978 | Cooke, Jr. | 73/154 X |
| 4,578,785 | 3/1986 | Gelfand | 166/250 X |

FOREIGN PATENT DOCUMENTS

| | | | |
|---|---|---|---|
| 1165791 | 10/1958 | France | 73/154 |
| 0156504 | 12/1963 | U.S.S.R. | 73/154 |
| 0732515 | 5/1980 | U.S.S.R. | 73/154 |

Primary Examiner—Eugene R. LaRoche
Assistant Examiner—Seung Ham
Attorney, Agent, or Firm—S. R. LaPaglia; E. J. Keeling; E. A. Schaal

[57] ABSTRACT

An apparatus is disclosed for developing a temperature profile of a well. That apparatus has a spring bow centralizer, wherein the bow of the centralizer contacts the sidewall of the well, and it has a temperature probe attached to the underside of the bow opposite to a point of contact with the sidewall. In one embodiment, the temperature probe is attached to the underside of the bow with studs and a shim steel backing. That temperature probe is a platinum resistance thermometer surface sensor less than 0.05 inches thick coated with a polyimide insulator.

11 Claims, 1 Drawing Sheet

DOWNHOLE TEMPERATURE MEASUREMENTS

The present invention relates to an apparatus for developing a rapid temperature profile of a well.

BACKGROUND OF THE INVENTION

One of the major problems in performing temperature surveys of steam zone observation wells is the poor response time due to heat convection in the water in the well.

Previously, such surveys were performed by lowering a temperature probe and its electronics down the center of the well hole. Because of temperature smearing due to heat convection in the water, a running survey of the well would give a significantly different temperature profile of a well than a stop-and-start survey. For instance, in one survey, when the survey was stopped the temperature rose over 50° F. over what was obtained at the same point from the running survey. Thus it would be advantageous to reduce the temperature smearing due to heat convection in the water.

Another problem associated with such surveys is that the temperatures in the steam zone observation wells can reach 600° F., which can adversely affect on the accuracy of surveys were the electronics are lowered into the well hole. Thus, it would be advantageous to use a system that allows the electronics to remain above ground.

SUMMARY OF THE INVENTION

The present invention is an apparatus for developing a temperature profile of a well. That apparatus comprises a spring bow centralizer (the bow of which contacts the sidewall of the well) and a temperature probe attached to the underside of the bow opposite to a point of contact with the sidewall. Such an apparatus reduces the temperature smearing due to heat convection in the water.

Preferably, studs and a shim steel backing are used to attach the probe to the bow. Preferably, the probe is a surface sensor, such as a platinum resistance thermometer coated with a polymeric insulator, such as a polyimide insulator. Preferably, the probe is less than 0.05 inches thick and has a response time of less than one minute.

In one embodiment, the apparatus further comprises a four-wire lead wire connected to the temperature probe; a armored electric wire line connected to the lead wire; and a means connected to the armored wire line for measuring the resistance of the probe, correcting for the resistance of the lead wire, and converting the value of that resistance to a temperature. Preferably, the lead wire has stranded copper conductors and is insulated with a polymeric material. Such an apparatus allows the electronics to remain above ground.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

DETAILED DESCRIPTION OF THE PREFERRED EMBODIMENTS

Figure 1:
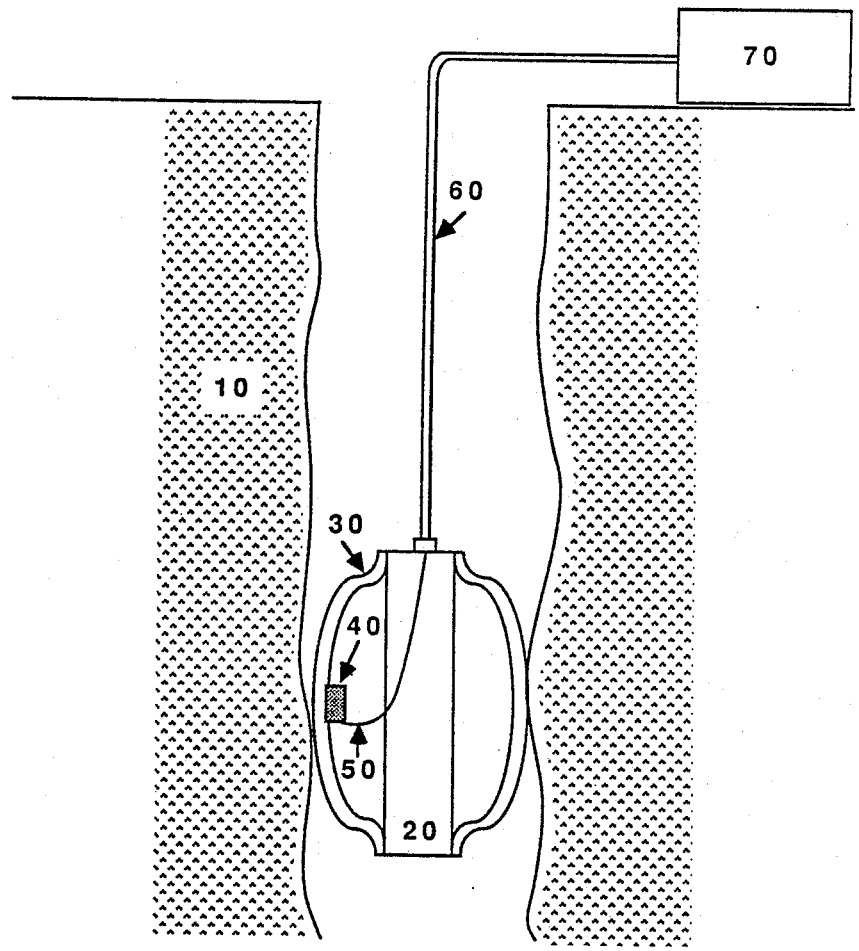
FIG. 1 is a schematic drawing of one embodiment of the present invention.

In its broadest aspect, the present invention is an apparatus for developing a temperature profile of a well. That apparatus comprises a spring bow centralizer and a temperature probe. The bow of the centralizer contacts the sidewall of the well. The probe is attached to the underside of the bow opposite to a point of contact with the sidewall.

In one embodiment, the apparatus comprises a spring bow centralizer; a temperature probe; a lead wire; an armored electric wire line; and a means for measuring the resistance of the probe, correcting for the resistance of the lead wire, and converting the value of that resistance to a temperature.

In that embodiment, the temperature probe is attached to the underside of the bow with studs and a shim steel backing opposite to a point of contact with the sidewall. That probe is a platinum resistance thermometer surface sensor having a response time less than one minute and being less than 0.05 inches thick coated with a polyimide insulator. The lead wire is connected to the temperature probe. That lead wire has a four-wire configuration, with stranded copper conductors and polymeric material insulators. The armored wire line is connected to the lead wire. The means for measuring the resistance of the temperature probe, correcting for the resistance of the lead wire, and converting the value of that resistance to a temperature is connected to the armored wire line.

By "spring bow centralizer", we mean a means of centering a tool downhole in a well, that means having a bow that is compressed and contacts the sidewall of the well. Such centralizers are well known in the art and have been used to center a variety of tools downhole. One such probe is a Catalog #11228-101 Bow Centralizer 22800 manufactured by the Kuster Tool Company.

The temperature probe is attached to the underside of the bow opposite to a point of contact with the sidewall of the well. By attaching the probe near the point of contact with the sidewall, we reduce the effects of heat convection and reduce the response time for the probe. That probe is attached with studs and a shim steel backing.

For best results, the temperature probe should be a platinum resistance thermometer that is sufficiently flat to work as a surface sensor. By "surface sensor", we mean a device to measure the temperature of a surface. Preferably, the temperature probe is less than 0.05 inches thick, more preferably, less than 0.025 inches thick. Its thinness allows for a rapid heat-up and cooldown. That probe is preferably coated with a polymeric insulator, such as a polyimide insulator.

One such probe is a Model 22800 manufactured by the RdF Corporation. That probe has worked with a response time of less than one minute, in some cases as short as three seconds. Its operating temperature range is given in Data Sheet No. 36680 as −269° C. to +288° C. with permissible exposure to 343° C. for short periods. Its standard sensing element is given as platinum with a resistance of 100 ohms at 0° C. and temperature coefficient of 0.00385 ohm/ohm/°C. (DIN 43760). Its accuracy is given as ±0.22 ohms (±0.57° C. or 0.45% of temperature, whichever is greater. Its stability is given as less than 0.2° C. drift per year at rated service temperature with proper mounting. Its the response is given as 70 milliseconds for the sensor to reach 63.2% of a step change in temperature in water flowing at 3 feet per second transverse to the sensor (ASTM-E-644). Its self heating is given as the bare sensor rising less than 1° C. while dissipating an I²R power of 3 milliwatts in still air (ASTM-E-644). Its insulation resistance between outer sensor insulation clamped between two metal plates and the commoned lead wire is given as 50 megohms minimum with 50 Volts DC applied to a dry sensor at room temperature (ASTM-E-644).

In one embodiment, the lead wire connected to the temperature probe has a four-wire configuration. That four-wire configuration allows two wires for temperature measurement and two wires for wire resistance correction. The lead wire has stranded copper conductors and is insulated with a polymeric material. Connected to the lead wire is a armored electric wire line. Connected to the armored wire line is a means for measuring the resistance of the temperature probe, correcting for the resistance of the lead wire, and converting the value of that resistance to a temperature. Such an apparatus allows the electronics to remain above ground, thereby overcoming the problem of downhole electronics being unable to sustain high temperatures.

Referring to FIG. 1, which is a schematic drawing of one embodiment of the present invention, a spring bow centralizer 20 is inserted in a well 10. The bow 30 of the centralizer contacts the sidewall of the well. Temperature probe 40 is attached to the underside of the bow 30 opposite to a point of contact with the sidewall of the well. That probe measures the temperature of the surface of the sidewall. Connected to probe 40 is a lead wire 50, which is connected to an armored electric wire line 60, which is connected to means 70 for measuring the resistance of the temperature probe, correcting for the resistance of the lead wire, and converting the value of that resistance to a temperature.

While the present invention has been described with reference to specific embodiments, this application is intended to cover those various changes and substitutions which may be made by those skilled in the art without departing from the spirit and scope of the appended claims.

What is claimed is:

1. An apparatus for developing a temperature profile of a well, said apparatus comprising:
 a spring bow centralizer, wherein the bow of said centralizer contacts the sidewall of the well; and
 a temperature probe attached to the underside of said bow opposite to a point of contact with the sidewall.

2. An apparatus according to claim 1 wherein said temperature probe is a platinum resistance thermometer.

3. An apparatus according to claim 2 wherein said platinum resistance thermometer is a surface sensor.

4. An apparatus according to claim 3 wherein said surface sensor is coated with a polymeric insulator.

5. An apparatus according to claim 4 wherein said polymeric insulator is a polyimide insulator.

6. An apparatus according to claim 3 wherein said surface sensor is less than 0.05 inches thick.

7. An apparatus according to claim 1 wherein the response time of said temperature probe is less than one minute.

8. An apparatus according to claim 1 wherein said temperature probe is attached to the underside of said bow with studs and a shim steel backing.

9. An apparatus according to claim 1 further comprising:
 a lead wire connected to said temperature probe, wherein said lead wire is has a four-wire configuration;
 a armored electric wire line connected to said lead wire; and
 a means connected to said armored electric wire line for measuring the resistance of said temperature probe, correcting for the resistance of the lead wire, and converting the value of that resistance to a temperature.

10. An apparatus according to claim 9 wherein said lead wire has stranded copper conductors and is insulated with a polymeric material.

11. An apparatus for developing a temperature profile of a well, said apparatus comprising:
 a spring bow centralizer, wherein the bow of said centralizer contacts the sidewall of the well;
 a temperature probe attached to the underside of said bow with studs and a shim steel backing opposite to a point of contact with the sidewall, wherein said temperature probe is a platinum resistance thermometer surface sensor less than 0.05 inches thick coated with a polyimide insulator, wherein the response time of said temperature probe is less than one minute;
 a lead wire connected to said temperature probe, wherein said lead wire is has a four-wire configuration, said lead wire has stranded copper conductors, and said lead wire is insulated with a polymeric material;
 a armored electric wire line connected to said lead wire; and
 a means connected to said armored electric wire line for measuring the resistance of said temperature probe, correcting for the resistance of the lead wire, and converting the value of that resistance to a temperature.

* * * * *